March 7, 1967 H. R. GRUBB 3,308,284

QUI-BINARY ADDER AND READOUT LATCH

Filed June 28, 1963 8 Sheets-Sheet 1

INVENTOR
HAROLD R. GRUBB
BY [signature]
AGENT

March 7, 1967 H. R. GRUBB 3,308,284

QUI-BINARY ADDER AND READOUT LATCH

Filed June 28, 1963 8 Sheets-Sheet 3

March 7, 1967 H. R. GRUBB 3,308,284

QUI-BINARY ADDER AND READOUT LATCH

Filed June 28, 1963 8 Sheets-Sheet 4

QUI-BINARY ADDER AND READOUT LATCH

Filed June 28, 1963 8 Sheets-Sheet 7

| | BCD | | | | | QUI-BINARY | | | | | | |
|---|---|---|---|---|---|---|---|---|---|---|---|---|
| | 1 | 2 | 4 | 8 | C | | B0 | B1 | Q0 | Q2 | Q4 | Q6 | Q8 |
| 0 | | X | | X | X | | X | | X | | | | |
| 1 | X | | | | | | | X | X | | | | |
| 2 | | X | | | | | X | | | X | | | |
| 3 | X | X | | | X | | | X | | X | | | |
| 4 | | | X | | | | X | | | | X | | |
| 5 | X | | X | | X | | | X | | | X | | |
| 6 | | X | X | | X | | X | | | | | X | |
| 7 | X | X | X | | | | | X | | | | X | |
| 8 | | | | X | | | X | | | | | | X |
| 9 | X | | | X | X | | | X | | | | | X |

March 7, 1967 H. R. GRUBB 3,308,284

QUI-BINARY ADDER AND READOUT LATCH

Filed June 28, 1963 8 Sheets-Sheet 8

United States Patent Office 3,308,284
Patented Mar. 7, 1967

3,308,284

QUI-BINARY ADDER AND READOUT LATCH

Harold R. Grubb, Owego, N.Y., assignor to International Business Machines Corporation, New York, N.Y., a corporation of New York Filed June 28, 1963, Ser. No. 291,345
12 Claims. (Cl. 235—174)

This invention relates to digital adding circuitry and more particularly to a novel adder using resistors and solid state components and operating in parallel fashion on qui-binary signals representing the coded decimal digits of numbers to be added and the readout means therefor.

In Data Processing Systems, information is frequently stored in accordance with the binary coded decimal system of notation. It is highly desirable to represent decimal digits in accordance with the binary coded decimal system since most operators are accustomed to this system. It is further highly desirable to provide adder circuit arrangements which can immediately generate signals representing the sum in direct response to the incoming coded decimal digits. To accomplish these desirable features, the use of a qui-binary adder enables an increase in the speed of operation with improved checking capabilities. This enables the addition to be accomplished during each basic clock period of the data processing system at a high rate of speed.

Such a parallel adder circuitry arrangement in particular requires that the circuitry be sufficiently fast acting to enable the carry digits to be propagated from the first to the last stage so that the output sum signals for all stages reach a steady state with a minimum of delay.

Accordingly, it is the principal object of the present invention to provide an improved qui-binary adder for use in data processing equipment.

It is a further object of this invention to provide a novelty adder employing solid state and resistor elements.

Still another object of the present invention is to provide translation means to furnish inputs to the adder in accordance with a qui-binary notation.

Another object of the present invention is to provide a novel latch readout means.

A still further object of the present invention is to provide an adder and translation circuitry capable of being constructed at appreciably lower cost.

Briefly, the present invention comprises a qui-binary adder circuit which adds the binary and quinary signals representing the decimal digits in a parallel fashion. The adder circuit is comprised of two concurrently operating sections, one for the quinary portion and the other for the binary portion of the decimal digits. The adder includes an input translator for converting the decimal digit inputs according to a binary coded decimal system of notation into a qui-binary system of notation for input to the adder circuitry. The outputs of the adder matrix circuitry are coupled through diode back circuit elimination devices for application to novel readout latch devices. The circuitry also includes an output translator for converting the reader latch outputs from qui-binary into binary coded decimal notation for transmission to storage memory units of the data processing system.

The foregoing and other objects, features and advantages of the invention will be apparent from the following more particular description of a preferred embodiment of the invention, as illustrated in the accompanying drawings.

In the drawings:

FIG. 1 is a schematic block and flow diagram of a portion of a data processing system showing the application of the present invention.

FIGS. 2*a* through 2*g* constitute a schematic diagram of the qui-binary adder and the translator circuits shown in FIG. 1.

*General description*

The instant invention concerns the presentation of a pair of decimal digits in binary coded decimal signal notation to a translator-adder configuration wherein the signals are translated to qui-binary notation, added to produce the sum result, which is then translated to binary coded decimal output notation for transmission to storage or memory means.

Figure 1:
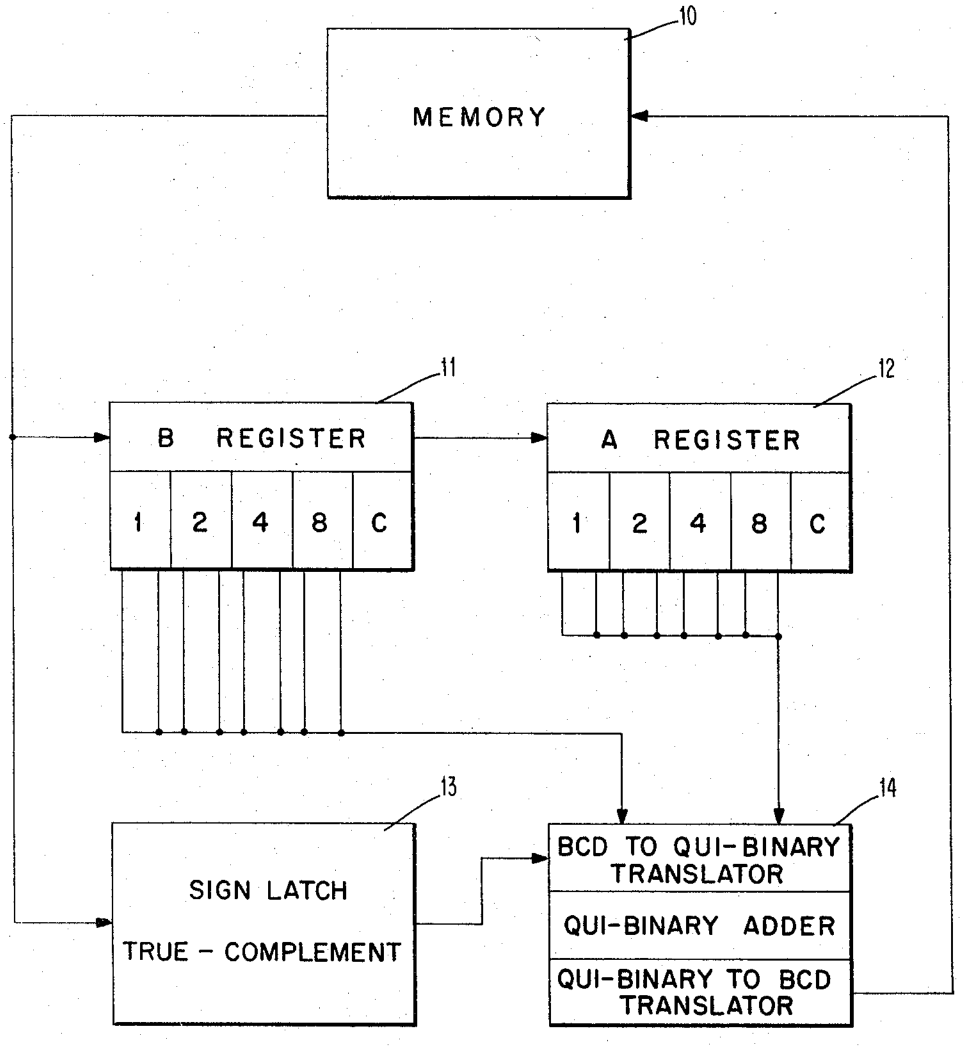

In FIG. 1 there is shown schematically a portion of a high-speed data processing system including the translator-adder circuitry configuration. The memory 10 may be a suitable storage device such as core storage, drum storage or the like. In the preferred embodiment, data is stored in memory in accordance with the binary coded decimal system of notation. Digital values to be added are read out of memory 10, one digit at a time, with the first digit of the first value being read out of memory 10 and passed by way of the B register 11 to the A register 12. The first digit of the second value is then passed to the B register 11. In both the A register 12 and the B register 11 the digits are stored in BCD (Binary Coded Decimal) notation. The sign representations for both values to be added are entered into the sign latch 13. The output signals of the B register 11, the A register 12 and the sign latch 13 are coupled to the inputs of the translator-qui-binary adder 14 for the purpose of effecting a translation and qui-binary adding operation followed by another translation with the result being transmitted back to memory 10 for storage therein.

The principal circuits of the translator-qui-binary adder are illustrated in FIGS. 2*a* through 2*g*. FIG. 3, shown on the sheet for FIG. 2*e*, indicates the manner in which the various views should be arranged.

Figure 2A:
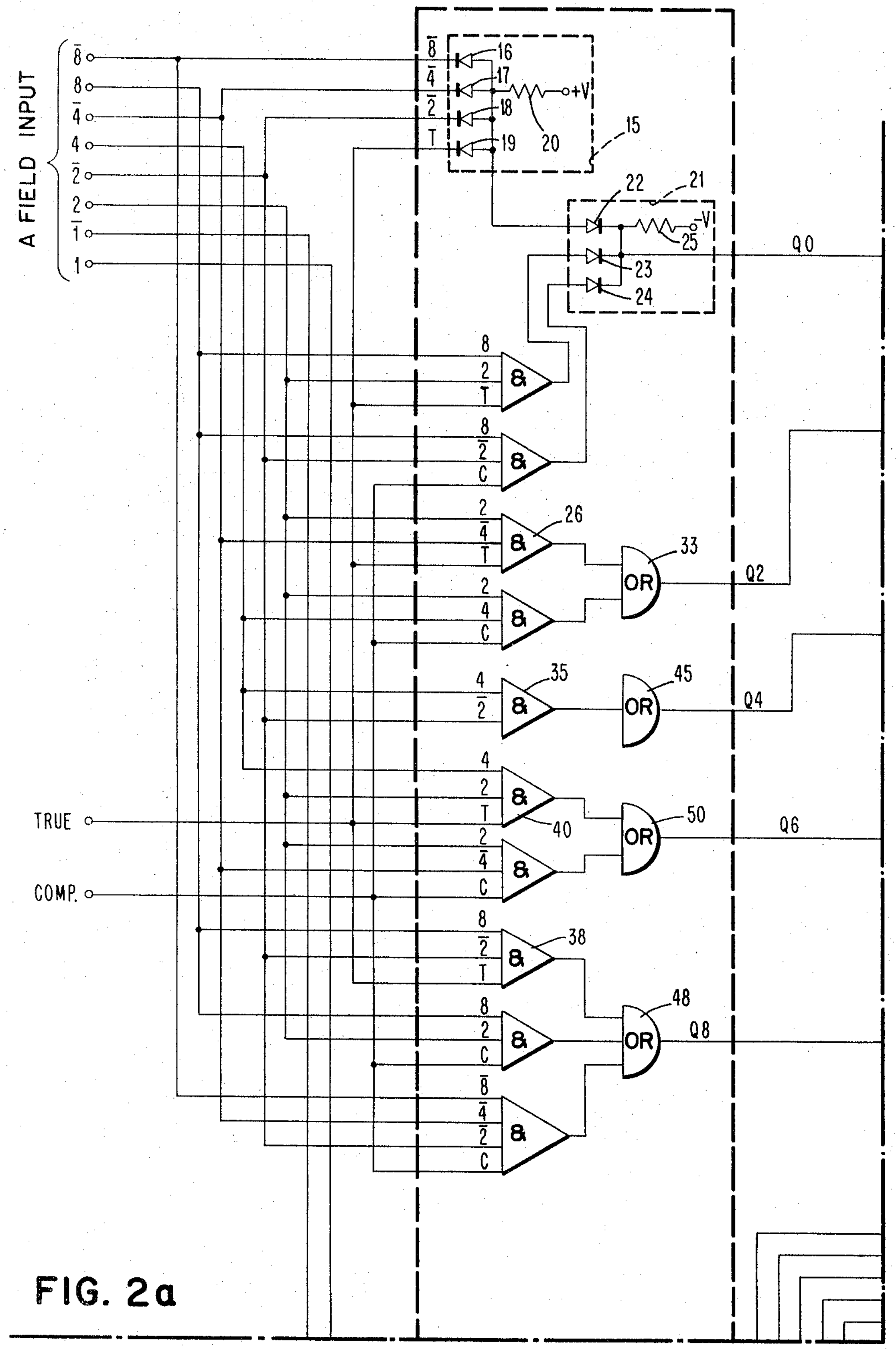
Figure 2B:
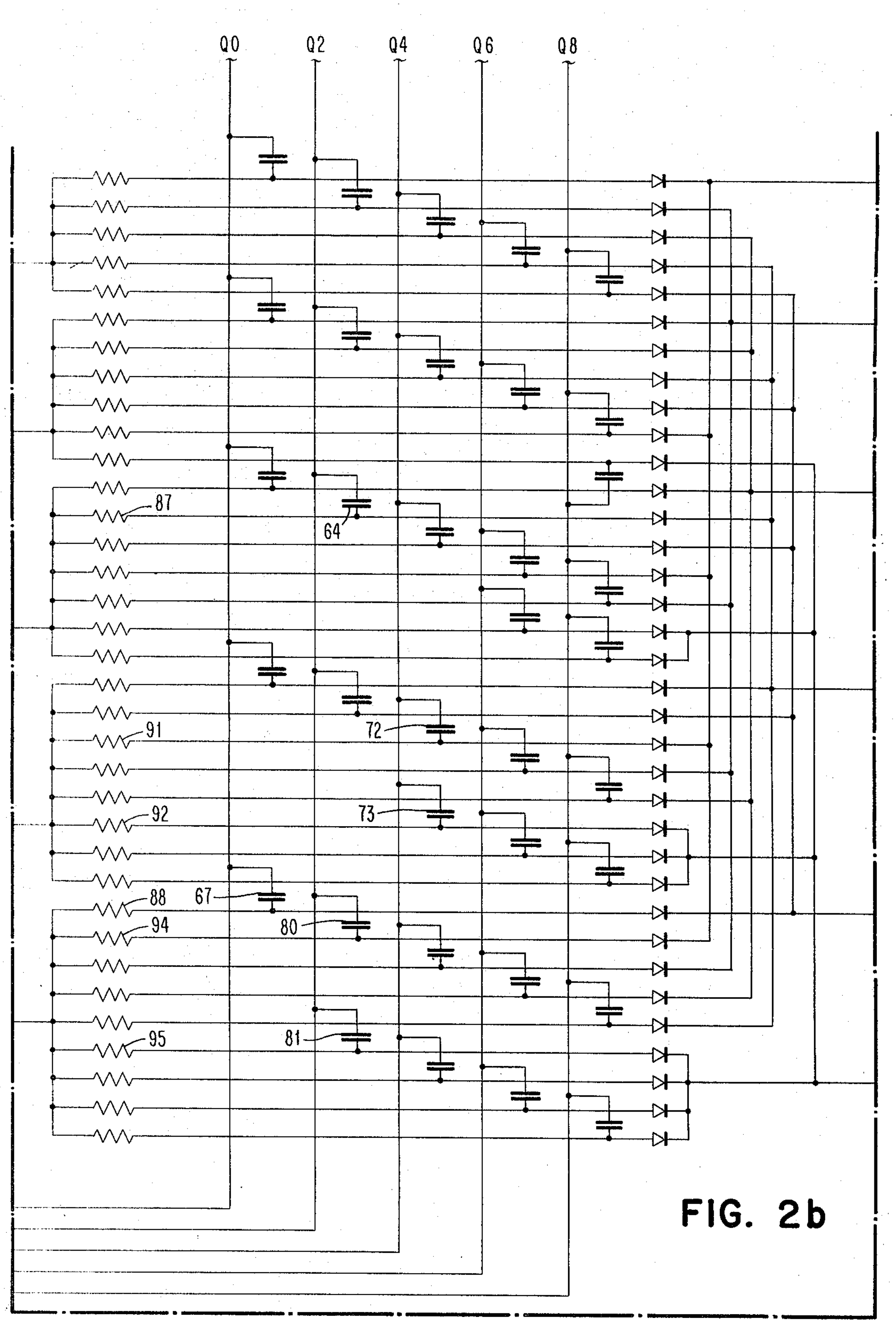
Figure 2C:
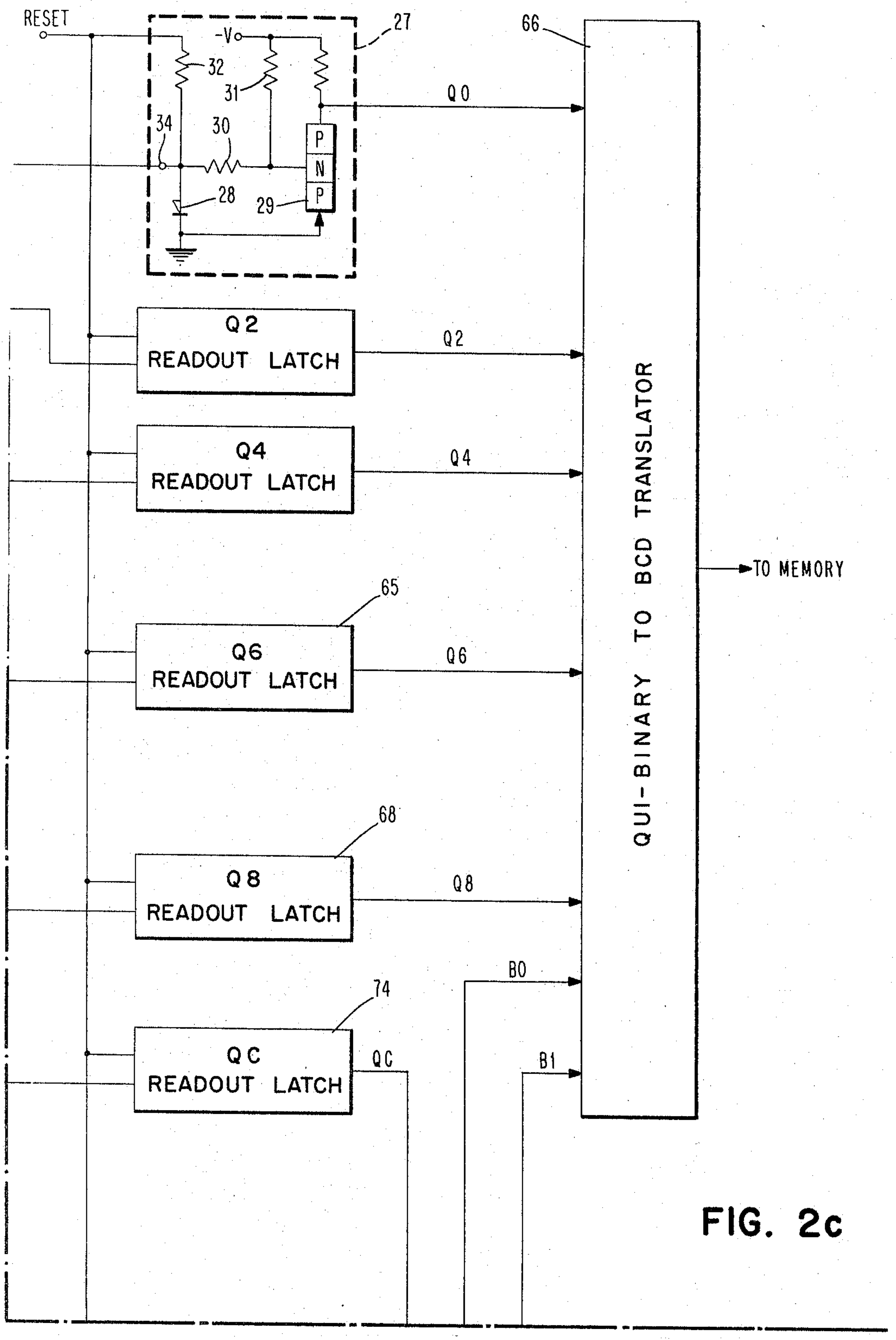
Figure 2D:
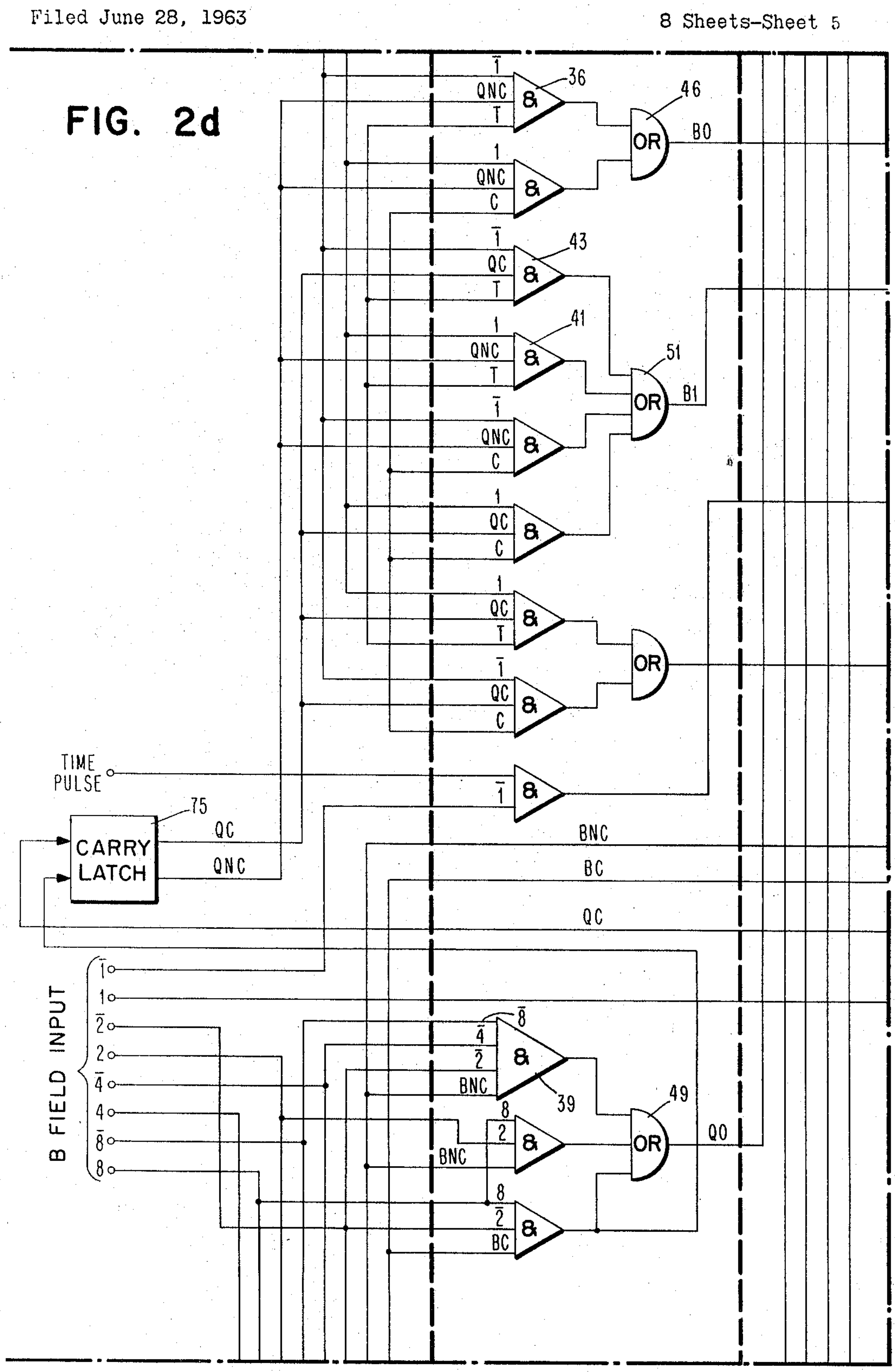
Figures 2E, 3:
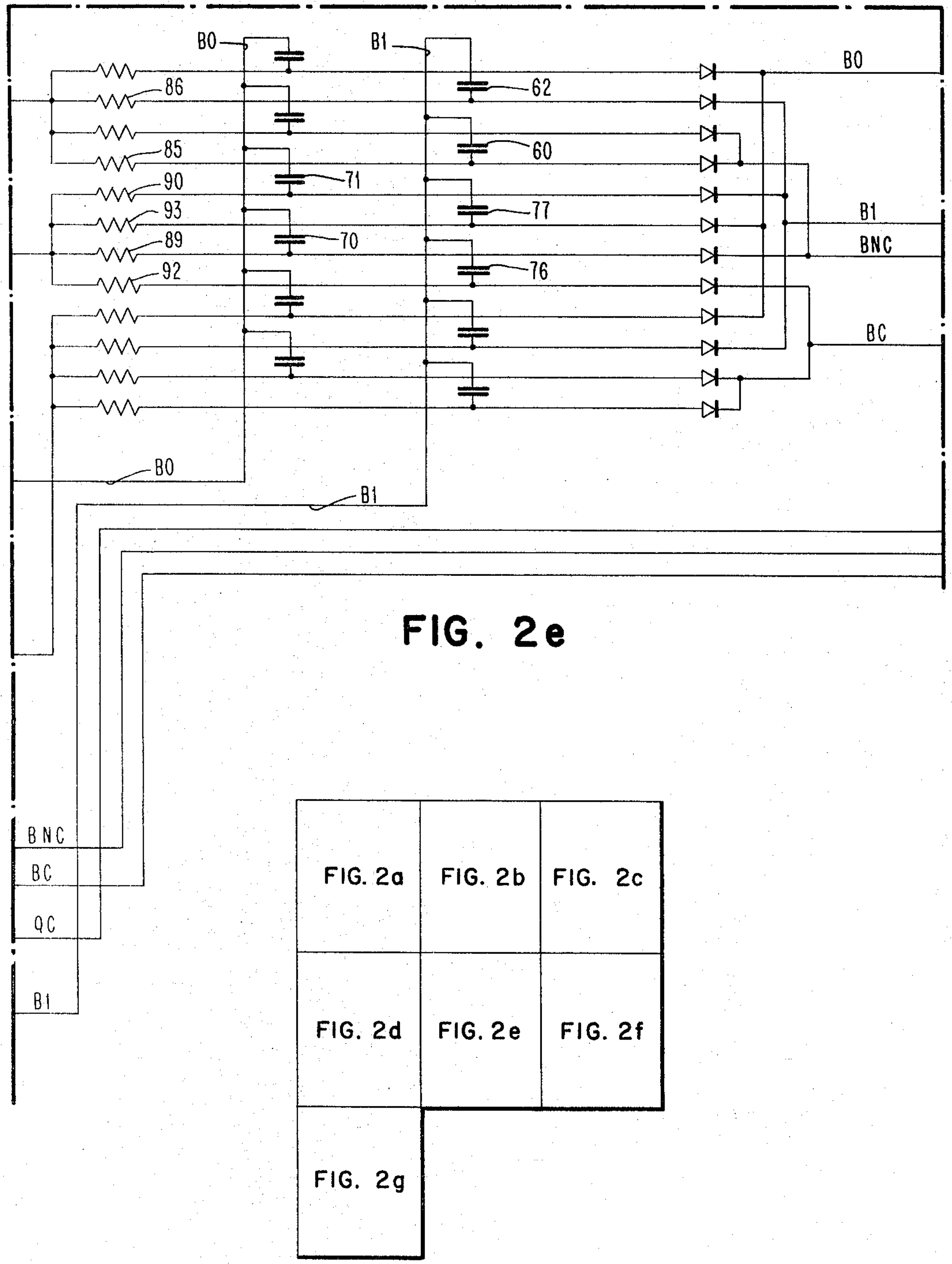
FIG. 3 is a diagram showing the manner in which FIGS. 2*a* through 2*g* should be joined together.
Figures 2F, 4:
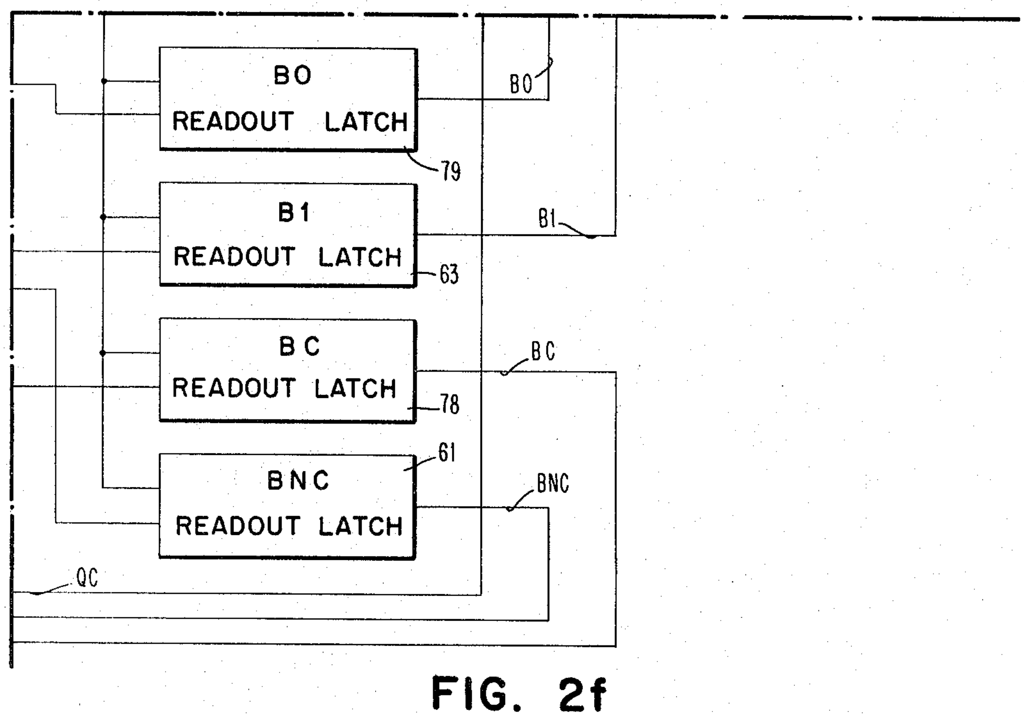
FIG. 4 is a chart showing the representations of digital data in accordance with a binary coded decimal and a qui-binary system of notation.
Figure 2G:
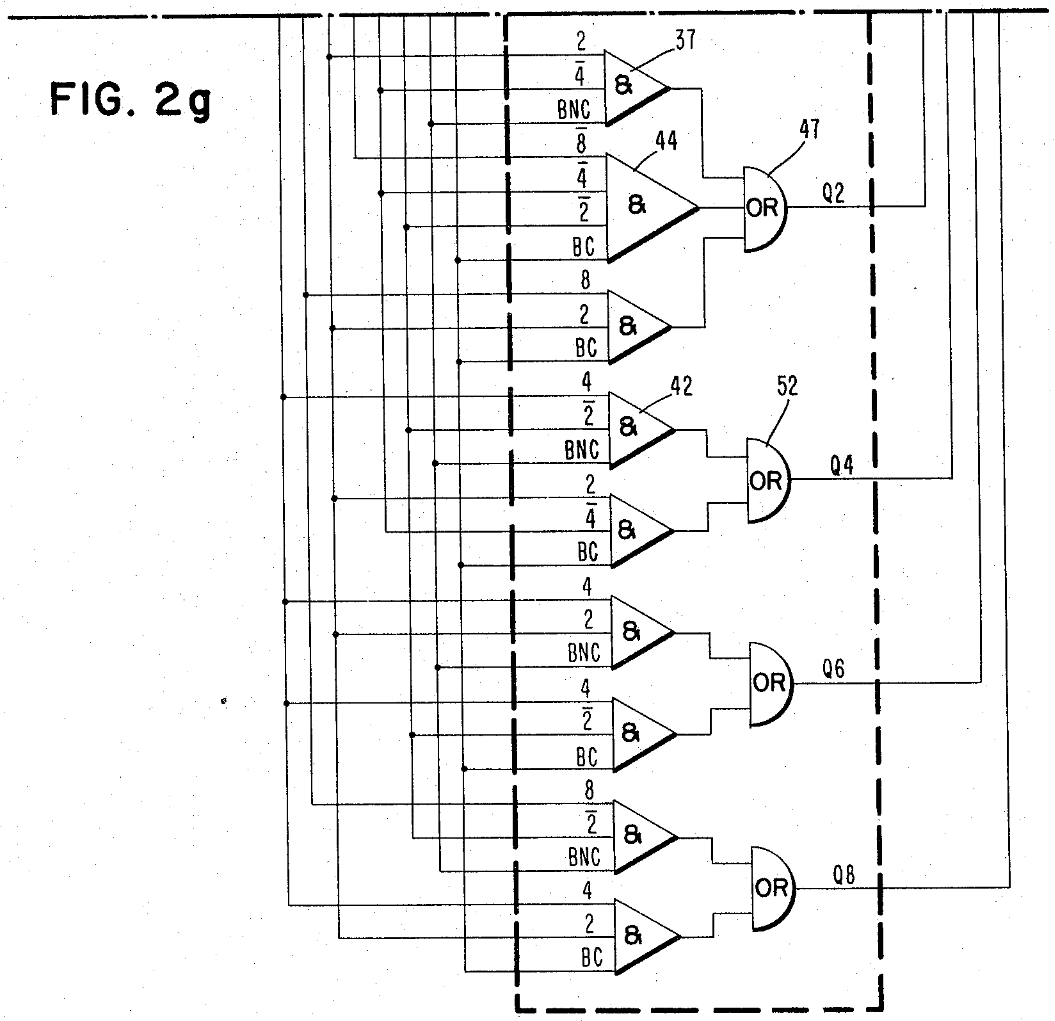

Attention will now be given to the AND and OR switching circuits which are generally shown in diagrammatic form in FIGS. 2*a* through 2*g*. In FIG. 2*a*, there is shown within the box 15 a typical coincidence switch of the positive AND type, and within the box 21 there is shown a typical mixer switch of the logical OR type circuit. For example, the positive AND circuit includes the diodes 16, 17, 18 and 19 having a common connection which is coupled through a voltage-dropping resistance 20 to a source of positive voltage. The individual input terminals of the diodes 16 through 19 are normally biased negatively so that the common terminal is normally at a negative potential with respect to ground. If coincident positive pulses are applied to the input terminals, the potential of the terminal is raised. However, if only one of the terminals is pulsed positively, the potential of the terminal is not raised appreciably. Any voltage responsive device may be controlled by the potential of the output terminal to furnish a usable output voltage level whenever a coincidence of positive input pulses is detected. Such a positive AND circuit is represented as a triangle, as for example, the triangle 26.

There is shown within the box 21 a typical mixer, otherwise known as a logical OR switch circuit, comprising the diodes 22, 23 and 24. The common output terminal of the diodes 22, 23 and 24 is connected by resistor 25 to a source of negative voltage. The diode input terminals are normally biased negatively. If any one of the diode input terminals is pulsed positively, the potential of the common output terminal is raised. It should be understood that two or more input terminals may be used, there being one diode for each of the input terminals. Any suitable voltage responsive device may be controlled by the potential of the common output terminal of the logical OR switch circuit. In the present drawings logical OR circuits are shown as an arc of a circle, as for example the arc 33.

In the box 27 there is shown a tunnel diode readout latch circuit comprising a tunnel diode 28, a transistor 29, voltage divider resistors 30 and 31 and bias resistor 32. The direction of the tunnel diode and the type of transistor depends on the input logic as does the direction of the logic diodes. Resistors 30 and 31 are a voltage divider arrangement which serve to allow the base of transistor 29 to be negative and supply base current when the tunnel diode 28 voltage is most negative and to allow the base of the transistor 29 to be ground or positive when the tunnel diode voltage is most positive. Bias resistor 32 serves to supply the bias to the tunnel diode 28. Reset of the latch is accomplished by changing the voltage on bias resistor 32 to some negative voltage. This may be acomplished through the application of a reset pulse. When the latch is in its "reset" condition, the tunnel diode is biased to its low voltage state by a plus voltage applied through resistor 32 and the transistor 29 is maintained conductive by the voltage applied to its base through the voltage divider arrangement comprising resistors 30 and 31 and the voltage drop across tunnel diode 28. The latch is "set" by applying a positive pulse to the input terminal 34. This pulse drives the tunnel diode over the peak of its I–V characteristic curve to its high voltage state and it also renders the transistor 29 non-conductive.

It is believed that the operation of the translator and qui-binary adder 14 will be most easily understood through the medium of the illustrated examples to be hereinafter described.

The first example, it will be shown how the numbers 84 and 13 are added together to produce the result of 97. The following chart shows the BCD (Binary Coded Decimal) and QB (Qui-Binary) equivalent of the numbers to be added and the result.

| | | BCD | | Qui-Binary | |
|---|---|---|---|---|---|
| A field | 8 4 | 8 | 4 | Q8–B0 | Q4–B0 |
| B field | 1 3 | 1 | 2–1 | Q0–B1 | Q2–B1 |
| | 9 7 | 8–1 | 4–2–1 | Q8–B1 | Q6–B1 |

In accordance with the previous explanation and with reference to FIG. 1, the first digit, 4, of the first value (A field) will be read from memory 10 and inserted in the A register 12 in BCD configuration. The first digit, 3, of the second value (B field) will be read from memory 10 and inserted in the B register 11. For this example, we may assume that the signs of both values are positive. The BCD outputs from both the A register 12 and the B register 11 and the "true" sign output from the sign latch 13 will be concurrently applied to the inputs of the translator-adder 14. Now with reference to FIGS. 2*a* through 2*g*, from the A field input terminals the 4 and $\bar{2}$ signals are coincidentally applied to the translator AND switch 35 and through OR switch 45 for application to the Q (Quinary) adder matrix. From the A field input terminals the $\bar{1}$, QNC and T (True) signals are coincidentally applied to the translator AND switch 36 and through OR switch 46 for application to the B (Binary) adder matrix. From the B field input terminals the 1 signal energizes the B1 matrix line. The output of OR switch 46 coupled with the B1 matrix line through resistor 85, and capacitor 60 forms a charging circuit for capacitor 60. As capacitor 60 nears its full charge, the potential will be effective in turning "on" the BNC (tunnel diode) latch 61. The output of OR switch 46 coupled with the B1 matrix line through resistor 86 and capacitor 62 is effective in turning "on" the B1 latch 63. From the B field input terminals the 2 and $\bar{4}$ signals are coincidentally applied with the output of the BNC latch 61 to the translator AND switch 37 and through OR switch 47 for application to the Q adder matrix. The outputs of OR switches 45 and 47 coupled through resistor 87 and capacitor 64 are effective in turning "on" the Q6 latch 65.

In summary, it has been shown how the B1 latch 63 and the Q6 latch 65 have been turned "on." These latches in the "on" condition provide a qui-binary representation of the digit 7, which is the sum of the first digits for the A and B field values. These signals are applied to the qui-binary to binary coded decimal translator 66 wherein the digit 7 is translated to its BCD equivalent for transmission to memory 10. After the readout has been effected, the BNC latch 61, the B1 latch 63 and the Q6 latch 65 will be reset.

The second digit 8 of the first value (A field) will be read from the memory 10 and inserted in the A register 12. The second digit 1 of the second value (B field) will be read from the memory 10 and inserted in the B register 11. The BCD outputs from both the A register 12 and the B register 11 and the T (True) sign output from the sign latch 13 will be concurrently applied to the inputs of the translator-adder 14.

From the A field input terminals, the 8, $\bar{2}$ and T signals are coincidentally applied to the translator AND switch 38 and through the OR switch 48 for application to the Q adder matrix. From the A field input terminals, the $\bar{1}$, QNC, and T signals are coincidentally applied to the translator AND switch 36 and through OR switch 46 for application to the B adder matrix. From the B field input terminals, the 1 signal energizes the B1 matrix line. The output of OR switch 46 coupled with the B1 matrix line through resistor 85 and capacitor 60 is effective in turning "on" the BNC latch 61. The output of OR switch 46 coupled with the B1 matrix line through resistor 86 and capacitor 62 is effective in turning "on" the B1 latch 63. From the B field input terminals, the $\bar{8}$, $\bar{4}$ and $\bar{2}$ signals are coincidentally applied with the output of the BNC latch 61 to the translator AND switch 39 and through the OR switch 49 for application to the Q adder matrix. The outputs of OR switches 48 and 49 coupled through resistor 88 and capacitor 67 is effective in turning on the Q8 latch 68.

Summarizing, it has been shown how the B1 latch 63 and the Q8 latch 68 has been turned "on." These latches in the "on" condition provide a qui-binary representation of the digit 9, which is the sum of the second digits for the A and B field values. These signals are applied to the qui-binary to BCD translator 66 wherein the digit 9 is translated to its BCD equivalent for transmission to memory 10. After the readout has been effected, the BNC latch 61, the B1 latch 63 and the Q8 latch 68 will be reset. Other digits from the A and B fields can be serially added in the same manner as described above to effectively produce the sum result of multidigit values for both the A and B fields.

In the second example, it will be shown how the numbers 87 and 14 are added together to produce the result of 101 and to illustrate how the carry operations are carried out. The following chart shows the BCD and QB equivalents of the numbers to be added and the result.

| | | BCD | | Qui-Binary | |
|---|---|---|---|---|---|
| A field | 8 7 | 8 | 4–2–1 | Q8–B0 | Q6–B1 |
| B field | 1 4 | 1 | 4 | Q0–B1 | Q4–B0 |
| | 1 0 1 | 8–2–0 | 1 | Q0–B0 | Q0–B1 |

In the same manner as described above, the first digit 7, of the first value (A field) is inserted in the A register 12. The first digit, 4, of the second value (B field) is inserted in the B register 11. The BCD outputs from both the A register 12 and the B register 11, and the true sign output from the sign latch 13, which in this case we will again assume to be positive, will be concurrently applied to the inputs of the translator-adder 14.

From the A field input terminals, the 4, 2 and T signals are coincidentally applied to the translator AND switch 40 and through OR switch 50 for application to the Q adder matrix. From the A field input terminals, the 1, QNC and true signals are coincidentally applied to the translator AND switch 41 and through OR switch 51 for application to the B adder matrix. From the B field input terminals, the $\bar{1}$ signal is switched with a time pulse in the AND switch and the output energizes the binary 0 matrix line. The output of the OR switch 51 coupled with the binary 0 matrix line through resistor 89 and capacitor 70 is effective in turning "on" the BNC latch 61. The output of the OR switch 51 coupled with the binary 0 matrix line through resistor 90 and capacitor 71 is effective in turning "on" the B1 latch 63. From the B field input terminals the 4 and $\bar{2}$ signals are coincidentally applied with the output of the BNC latch 61 to the translator AND switch 42 and through the OR switch 52 for application to the Q adder matrix. The outputs of the OR switches 50 and 52 coupled through resistor 91 and capacitor 72 are effective in turning "on" the Q0 latch 27. The outputs of OR switches 50 and 52 coupled through resistor 92 and capacitor 73 is effective in turning "on" the Q carry latch 74.

In summary, it has been shown how the B1 latch 63 and the Q0 latch 27 have been turned "on" and these latches in the "on" condition provide the qui-binary representation of the digit 1 which is the first digit of the sum of the first digits for the A and B field values. These signals are applied to the QB to BCD translator 66 wherein the digit 1 is translated to its BCD equivalent for transmission to memory 10. The turning "on" of the Q carry latch 74 will turn "on" the carry latch 75 so as to provide a carry signal for the addition of the second digits, now to be described. After the readout has been effected, the BNC latch 61, the B1 latch 63 and the Q0 latch 27 will be reset.

The second digit, 8, of the first value (A field) will be inserted in the A register 12. The second digit, 1, of the second value (B field) will be inserted in the B register 11. The BCD outputs from both the A register 12 and the B register 11 with the true sign output from the sign latch 13 will be concurrently applied to the inputs of the translator-adder 14.

From the A field input terminals, the 8, $\bar{2}$ and T signals are coincidentally applied to the translator AND switch 38 and through OR switch 48 for application to the Q adder matrix. From the A field input terminals, the $\bar{1}$ and T signals are coincidentally applied with the QC signal from carry latch 75 to the translator AND switch 43 and through the OR switch 51 for application to the B adder matrix. From the B field input terminals, the 1 signal energizes the B1 matrix line. The output of OR switch 51 coupled with the B1 matrix line through resistor 92 and capacitor 76 is effective in turning on the BC latch 78. The output of OR switch 51 coupled with the B1 matrix line through resistor 93 and capacitor 77 is effective in turning "on" the B0 latch 79. From the B field input terminals, the $\bar{8}$, $\bar{4}$ and $\bar{2}$ signals are coincidentally applied with the output of the BC latch 78 to the translator AND switch 44 and through OR switch 47 for application to the Q adder matrix. The outputs of OR switches 47 and 48 coupled through resistor 94 and capacitor 80 are effective in turning "on" the Q0 latch 27. The outputs of OR switches 47 and 48 coupled through resistor 95 and capacitor 81 are effective in turning "on" the QC latch 74.

Recapitulating, it has been shown how the B0 latch 79 and the Q0 latch 27 have been turned "on." These latches in the "on" condition provide a QB representation of the digit 0, which is the sum of the second digits from the A and B field values. These signals are applied to the QB to BCD translator 66 wherein the digit 0 is translated to its BCD equivalent for transmission to memory 10. The QC latch 74 in the "on" condition will be effective in turning "on" the carry latch 75 to provide a carry signal for the subsequent occurring digit addition cycle. After the readout has been effected, the BC latch 78, the B0 latch 79 and the Q0 latch 27 will be reset.

Recapitulating as a whole, it has been shown and described how the translator-qui-binary adder has operated to accomplish a translation of digital values from BCD to qui-binary followed by an adder operation and retranslation from qui-binary to BCD, in conjunction with two illustrative examples of numeric data from a memory storage device 10, to compute a result and store the result back in the memory storage device 10.

While the invention has been particularly shown and described with reference to a preferred embodiment thereof, it will be understood by those skilled in the art that various changes in form and details may be made therein without departing from the spirit and scope of the invention.

What is claimed is:

1. A circuit for adding coded decimal digits comprising:
(a) first and second sets of input lines providing first and second sets of concurrent signals representing the decimal digits in a normal number system,
(b) an adder matrix coupling means including capacitive elements for selectively coupling said first set of input lines with said second set of input lines, and
(c) a set of sum output lines including back circuit elimination means.

2. A qui-binary adder and readout circuit comprising:
(a) first and second sets of input lines providing first and second sets of concurrent signals representing the decimal digits in accordance with a normal numbering system,
(b) a translating means including a plurality of AND and OR switch circuit configurations for converting the signals on said first and second sets of input lines from binary coded decimal to qui-binary notation,
(c) an adder matrix including capacitive elements for selectively coupling the outputs of said AND and OR switch circuits for deriving sum representing signals, and
(d) a set of sum output lines each including a latch circuit adapted to respond to the sum representing signals from said adder matrix.

3. A qui-binary adder and readout latch circuit comprising:
(a) first and second sets of input lines providing first and second sets of concurrent signals representing the decimal digits in a normal number system,
(b) an adder matrix coupling arrangement including resistive and capacitive elements and means selectively coupling said first set of input lines with said second set of input lines,
(c) adder matrix output means, each line including a diode back circuit elimination means, and
(d) a set of readout latches coupled with said adder matrix output lines and adapted to provide sum digit output representations according to a qui-binary system of number notation.

4. A qui-binary adder and readout latch circuit comprising:
(a) first and second sets of input lines providing first and second sets of concurrent signals representing decimal digits of a normal number system,
(b) an adder matrix coupling arrangement including resistive and capacitive elements and means for selectively coupling said first set of input lines with said second set of input lines, (c) adder matrix output lines, each line including a diode back circuit elimination device, (d) a set of readout latches coupled with said adder matrix output lines, each readout latch comprising, (e) a voltage divider adapted for connection to a potential source having different voltage levels and at least a pair of intermediate junctions, (f) a transistor connected in common circuit configuration and having its base terminal connected to one of said junctions, (g) a tunnel diode connected to the other junction and responsive to potential changes at that junction for controlling the switching of said transistor between its two states of operation, and (h) a set of sum output lines controlled by said readout latches, the adder and readout latch circuit being adapted to provide said sum output lines with sum representations according to a qui-binary system of notation.

5. A translator adder circuit for adding coded decimal digits comprising:

(a) a first set of input lines to which augend representing signals are applied in a first code configuration, (b) a second set of input lines to which addend representing signals are applied in said first code configuration, (c) a translating array of diode switches for converting the decimal digit representing signals applied to said first and second sets of input lines according to said first code configuration into a second code configuration, (d) an adder matrix coupling means including resistive and capacitive elements for selectively coupling the outputs from said translating array for said first set of input lines with the outputs from said translating array for said second set of input lines, (e) a set of sum lines including diode devices and transistorized diode readout latches and coupled with said matrix coupling means, and (f) carry control means responsive to the outputs from said sum lines for concurrently applying carry control inputs with said second set of input lines.

6. A translator-adder circuit for adding coded decimal digits comprising:

(a) a first set of input lines to which augend representing signals are applied in binary coded decimal code, (b) a second set of input lines to which addend representing signals are applied in binary coded decimal code, (c) a set of sign control input lines, (d) a translating array of plus AND and OR diode switches for converting the decimal digit representing signals applied to said first and second sets of input lines in binary coded decimal code into signals according to qui-binary code notation, (e) a first adder matrix coupling means including resistive and capacitive elements for selectively coupling the quinary representing signal outputs from said translating array for said first set of input lines with the quinary representing signal outputs from said translating array for said second set of input lines, (f) a second adder matrix coupling means including resistance and capacitive elements for selectively coupling the binary representing signal outputs from said translating array for said first set of input lines with the binary representing signal outputs from said translating array for said second set of input lines, (g) a set of sum lines including diode devices and transistorized readout latches and coupled with said first adder matrix coupling means, (h) a set of sum lines including diode devices and transistorized readout latches and coupled with said second adder matrix coupling means, (i) a carry latch responsive to the quinary carry signal from said first adder matrix to provide a carry control for the successively occurring digit adding cycle, and (j) a pair of binary carry control lines responsive to the outputs of said second adder matrix for concurrent application with the inputs to said translating array.

7. A qui-binary adder and readout circuit comprising:

(a) a first set of input lines to which augend representing signals are applied, (b) a second set of input lines to which addend representing signals are applied, (c) an adder matrix coupling means including resistive and capacitive elements for selectively coupling said first set of input lines with said second set of input lines, and (d) a set of readout latch circuits coupled with the adder matrix output lines.

8. A qui-binary adder and readout circuit comprising:

(a) a first set of input lines to which augend representing signals are applied, (b) a second set of input lines to which addend representing signals are applied, (c) an adder matrix coupling means including resistive and capacitive elements for selectively coupling said first set of input lines with said second set of input lines, (d) a set of adder matrix output lines, each line including a diode device, and (e) a set of readout latch circuits coupled with predetermined configurations of said adder matrix output lines.

9. A qui-binary adder and readout circuit comprising:

(a) a first set of input lines to which augend representing signals are applied, (b) a second set of input lines to which addend representing signals are applied, (c) an adder matrix coupling means including resistive and capacitive elements for selectively coupling said first set of input lines with said second set of input lines, (d) a set of adder matrix output lines, each line including a diode device, (e) a set of readout latch circuits coupled with predetermined configurations of said adder matrix output lines, and (f) carry control means responsive to a preselected group of said adder matrix output lines for concurrently applying carry control signals to said sets of input lines.

10. A qui-binary adder and readout circuit comprising:

(a) a first set of input lines to which augend representing signals are applied, (b) a second set of input lines to which addend representing signals are applied, (c) an adder matrix coupling means including resistive and capacitive elements for selectively coupling said first set of input lines with said second set of input lines, (d) a set of adder matrix output lines, each line including a diode device, (e) a set of readout latch circuits coupled with predetermined configurations of said adder matrix output lines, (f) carry control means responsive to a preselected group of said adder matrix output lines for concurrently applying carry control signals to said sets of input lines, and (g) a carry latch responsive to said carry control means to provide a carry control signal to the next successively occurring digit adding cycle.

11. A qui-binary adder and readout circuit comprising:

(a) a first set of input lines to which augend representing signals are applied in a qui-binary system of notation, (b) a second set of input lines to which addend representing signals are applied in a qui-binary system of notation, (c) a first adder matrix coupling means including resistive and capacitive elements for selectively coupling the quinary representing signals applied to said first set of input lines with the quinary representing signals applied to the second set of input lines, (d) a second adder matrix coupling means including resistive and capacitive elements for selectively coupling the binary representing signals applied to said first set of input lines with the binary representing signals applied to said second set of input lines, (e) a set of readout latch devices coupled with said first adder matrix coupling means to provide a quinary sum representing signal, and (f) a second set of readout latch devices coupled with said second adder matrix coupling means to provide a binary sum representing signal.

12. A qui-binary adder and readout circuit comprising:

(a) a first set of input lines to which augend representing signals are applied in a qui-binary system of notation, (b) a second set of input lines to which addend representing signals are applied in a qui-binary system of notation, (c) a first adder matrix coupling means including resistive and capacitive elements for selectively coupling the quinary representing signals applied to said first set of input lines with the quinary representing signals applied to the second set of input lines, (d) a second adder matrix coupling means including resistive and capacitive elements for selectively coupling the binary representing signals applied to said first set of input lines with the binary representing signals applied to said second set of input lines, (e) a set of readout latch devices coupled with said first adder matrix coupling means to provide a quinary sum representing signal, (f) a second set of readout latch devices coupled with said second adder matrix coupling means to provide a binary sum representing signal, (g) carry control means responsive to a preselected group of said adder matrix output lines for concurrently applying carry control signals to said sets of input lines, and (h) a carry latch responsive to said carry control means to provide a carry control signal to the next successively occurring digit adding cycle.

References Cited by the Examiner

UNITED STATES PATENTS

| | | | |
|---|---|---|---|
| 2,951,637 | 1/1954 | Lind | 235—159 |
| 2,996,305 | 12/1960 | Rosenberger | 235—175 |
| 3,009,639 | 11/1961 | Hoppe | 235—174 |
| 3,015,445 | 1/1962 | Kashio | 235—174 |
| 3,152,262 | 10/1964 | Carroll et al. | 307—88.5 |
| 3,171,974 | 3/1965 | Dieffenderfer | 307—88.5 |
| 3,175,102 | 3/1965 | Ulrich | 307—88.5 |

OTHER REFERENCES

Allen: "High-Order-First Arithmetic Device," IBM Technical Disclosure Bulletin, pages 21–22, April 1961, vol. 3, No. 11.

References Cited by the Applicant

UNITED STATES PATENTS 2,991,009 7/1961 Edwards.

MALCOLM A. MORRISON, *Primary Examiner.*

ROBERT C. BAILEY, *Examiner.*

M. J. SPIVAK, *Assistant Examiner.*